Aug. 26, 1952 R. R. HANCOX ET AL Re. 23,538

PROCESS AND APPARATUS FOR MANUFACTURE OF IRON SHOTS

Original Filed July 23, 1948 2 SHEETS—SHEET 1

INVENTORS:
ROBERT R. HANCOX
GEORGE L. TUER, JR.
MILO J. STUTZMAN
BY Brumiga and Schlenker
ATTORNEYS.

PROCESS AND APPARATUS FOR MANUFACTURE OF IRON SHOTS

Original Filed July 23, 1948 2 SHEETS—SHEET 2

INVENTORS:
ROBERT R. HANCOX
GEORGE L. TUER. JR
MILO J. STUTZMAN
BY Bruninga and Sutherland
ATTORNEYS Reissued Aug. 26, 1952

Re. 23,538

UNITED STATES PATENT OFFICE 23,538

PROCESS AND APPARATUS FOR MANUFACTURE OF IRON SHOT

Robert R. Hancox, Kansas City, Mo., George L. Tuer, Jr., Cleveland, Ohio, and Milo J. Stutzman, Kansas City, Mo., assignors to Olin Industries, Inc., East Alton, Ill., a corporation of Delaware Original No. 2,544,678, dated March 13, 1951, Serial No. 40,276, July 23, 1948. Application for reissue March 12, 1952, Serial No. 276,106

5 Claims. (Cl. 18—2.6)

Matter enclosed in heavy brackets [ ] appears in the original patent but forms no part of this reissue specification; matter printed in italics indicates the additions made by reissue.

This invention relates to the manufacture of "shot" and more particularly the manufacture of iron shot useable as the projectile charge of shot shells, but also for other purposes, such as shot peening, cleaning of castings, and granite cutting.

Commercial shot as used in shot gun shells or cartridges have heretofore consisted of lead or lead alloys in spite of various disadvantages to which lead shot are subject. Such shot are usually manufactured by dropping the molten metal from the perforations in the bottom of a pan or riddle at top of a shot tower. During the fall through air, the globules assume a spherical shape, solidify as shot having a diameter roughly dependent upon the size of the perforations of the riddle, and are finally collected in a quenching medium such as water. Because of a unique combination of physical properties, lead can be fabricated into a round shot of a desired size so efficiently and economically by the method described that it has not proved commercially feasible to fabricate shot of other desirable, but more difficultly workable, metals such as iron.

In general, iron shot may be formed by one of two methods, namely, the method of forming drops of molten metal and allowing them to fall into a quenching medium, and the method of casting. For mass production of the sizes of shot encountered in shot shells, the technique of casting is prohibitively expensive. Various drop-forming methods, including subdividing a falling stream of molten metal by means of a beater member, atomizing, and the perforated crucible method similar to that used in the making of lead shot, have been used heretofore in the attempted manufacture of iron pellets or shot. The particles so produced consist of spheres, spheriods, discs, dumb-bells, and pear-shaped particles, or even irregular shaped particles with little uniformity in size. In some instances, only 15% of shot formed by atomizing was found to be useable for ammunition. In prior methods for making ferrous shot wherein an apertured member or drop pan was utilized to subdivide the molten metal, it has been found that the apertures of said member very rapidly eroded or washed away so as to effect a disadvantageous change in the size of the stream passed. Unlike the practice of making lead shot, the size of orifices in a drop pan cannot be depended upon to control the size of shot formed of iron because the iron "wets" the material surrounding the orifice.

A principal object of this invention, therefore, is to provide an apparatus for producing ferrous shot.

Another object is to provide an improved *process and* apparatus for producing, on a large scale, iron shot, a large proportion of which are of useable sizes. Another object is to provide an apparatus *and process* for producing iron shot of good spherical configuration. Other objects and advantages will be apparent from the following description and accompanying drawing, in which.

In accordance with the present invention, iron shot having a favorable regularity of shape and a high uniformity of size are produced by interposing, in the path of fall of a stream of molten metal, a moving *wet* screen whose active area is constituted of substantially more open spaces than of closed (solid) substance. Indeed it is preferable that the openings in the screen occupy at least 65% of the overall active area of the screen. By "active area" is meant that portion of the screen which, in normal operation, will be interposed in the path of falling molten metal. The molten metal may be dropped from a ladle, furnace, or crucible, situated at an elevation above the screen.

After the stream of molten metal passes through the screen, it is subdivided into particles which have the desired volume. The particles are then deposited in a quenching bath, through which, in the course of further fall, they assume their final near-spherical shape and are set. The quenching bath may be in the form of a spray or pool of water or any other cooling liquid, with or without antioxidants, and should be maintained at or slightly above room temperature. Above 80° F., the sphericity of the shot decreases about 5% for each 20° F., rise in temperature of the bath, but bath temperatures down to nearly freezing produce satisfactory results.

The material of which the screen is made is preferably bibulous or bibulous-covered, although satisfactory results are attainable with non-bibulous screens if a layer of water or other cooling liquid is maintained on the screen at the region which traverses the path of the falling molten metal. Consistent with the strength necessary to withstand the impact of the molten metal, without too much sacrifice of open area, textile fabric screens may be used. Bibulous screens formed of other fibers, such as ramie, synthetic textiles, asbestos, and the like, may be used. Wire or plastic strands covered with bibulous material are quite satisfactory.

The direction of movement of the screen may be varied within wide limits. Satisfactory results are obtained with screens disposed to move in a plane within 45°, plus or minus, of horizontal.

Figure 1:
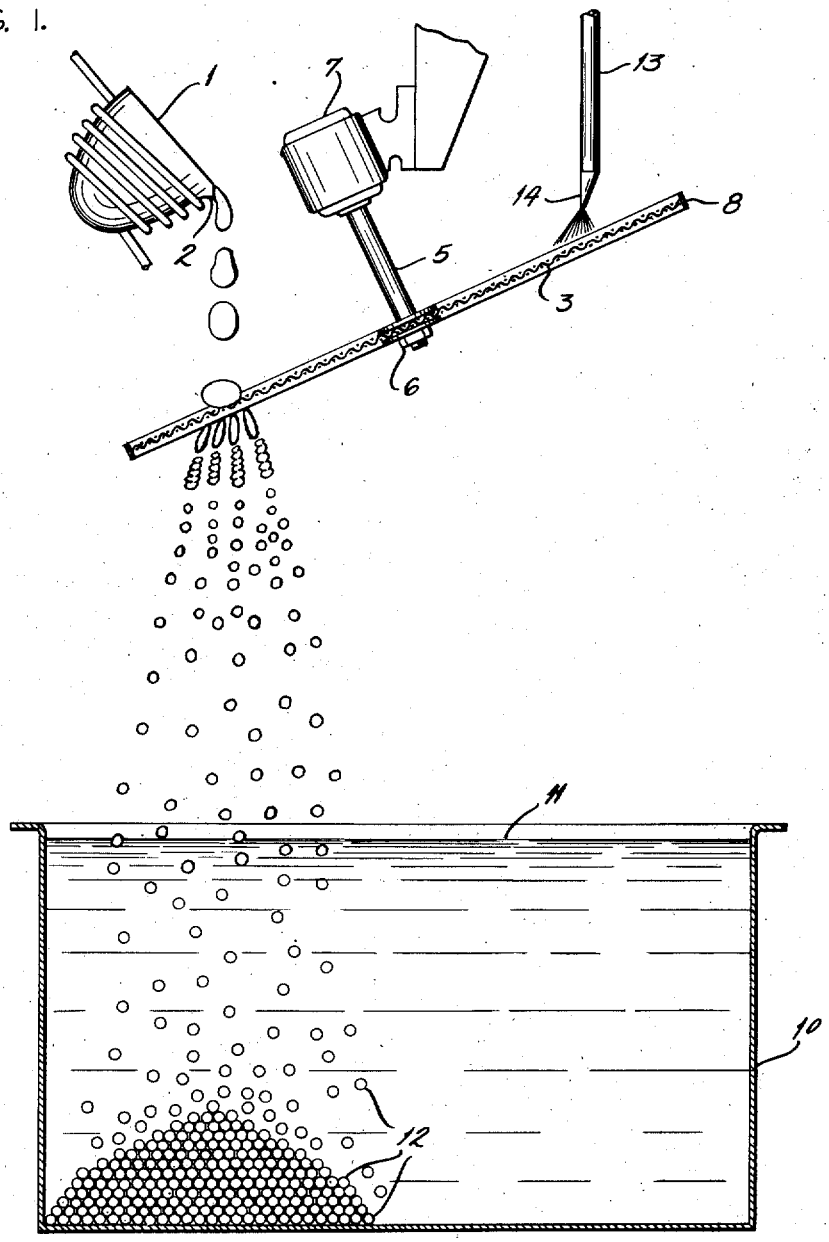
Figure 1 is a schematic elevational view, partly in cross section, of a preferred embodiment of the invention.
Figure 4:
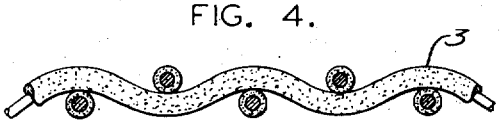
Figure 4 is a fragmentary view, in section, of the member of Figure 3.
Figure 2:
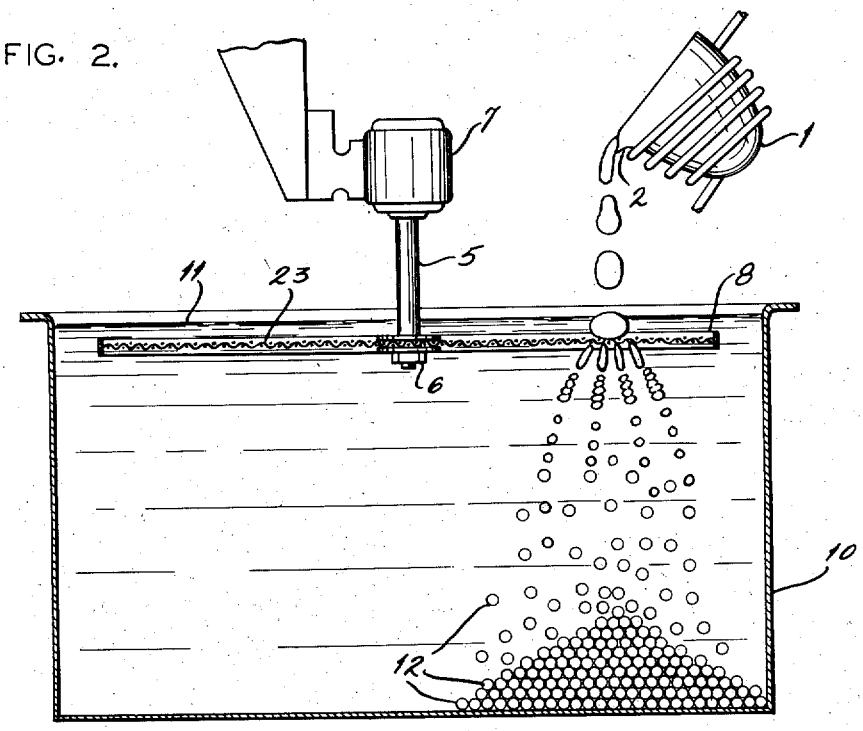
Figure 2 is a schematic elevational view, partly in section, showing a modified form of the apparatus of Figure 1.

In making shot in accordance with this invention, the apparatus of either Figure 1 or Figure 2 may be used and consists generally of supply means, such as a ladle (which may be a small induction furnace) or a perforated crucible or pot, a continually [cooled] *wet* foraminous member of the type described herein for subdividing the molten metal stream into molten shot, and a means for quenching and collecting the shot. In the fall from the furnace, the molten metal stream will break up into globules, due to the influence of surface tension. These globules are subdivided, upon meeting the screen from which they emerge, into "banana" shapes. Surface tension acts upon the tiny "bananas" to subdivide them into spheres and near-spheres before they set.

Figure 3:
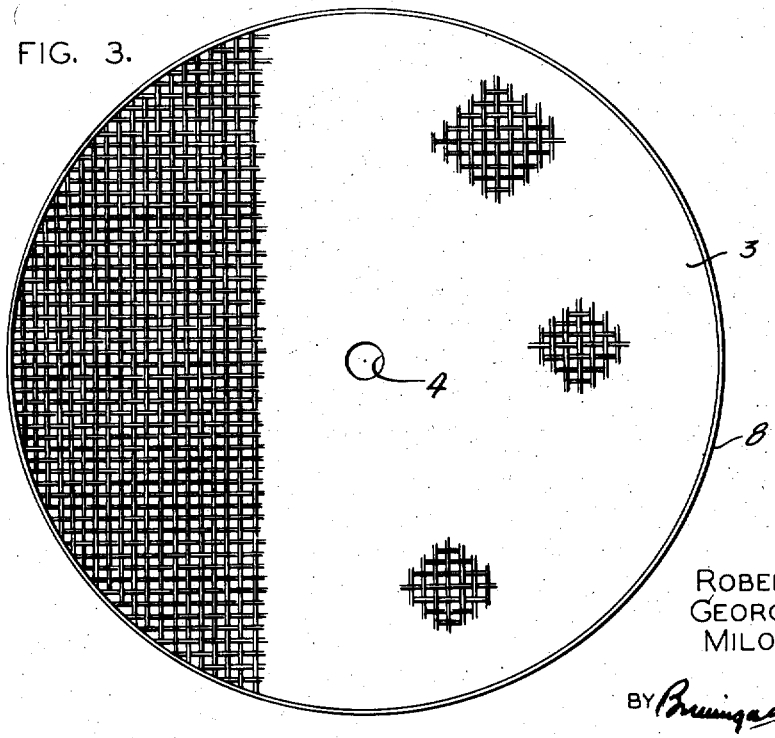
Figure 3 is a plan view of the foraminous member used in the apparatus.

The shot-making apparatus of Figure 1 includes means for dropping molten metal, such as the ladle 1 having a lip 2. Disposed in a horizontal or inclined plane below the lip 2 is a rotatable foraminous member 3 constructed of fabric or wire mesh having an open weave of a suitable mesh size. A suitable foraminous member 3 may be in the form illustrated in Figure 3 and consists of a circular-piece screen, the individual wires of which are covered with cotton. Alternatively, cotton mesh, or lacquered, enameled, or otherwise thermally insulated wire mesh may be used. The screen 3 may be pierced by a hole 4 in order that the plate may be centrally mounted for rotation. Mounted upon the end of the vertical shaft 5 by any means, such as a combination of washers and nut 6, the screen is driven by a suitable means, such as electric motor 7 through shaft 5. A hoop 8 may be provided to hold the screen taut. Disposed below the screen 3 is a vessel 10 containing a quenching liquid 11, such as water or any other suitable coolant, to a suitable depth for receiving and solidifying the falling shot 12 formed at the screen. In order that the member 3 be continually cooled, the cotton covering of the screen is kept well wet with *water or other cooling* liquid at all times. To accomplish this, a pipe 13 terminating in nozzle 14 is so placed that portions of the cotton covered screen utilized for the subdivision of falling metal are alternately subjected first to the stream of cooling liquid issuing from nozzle 14, and then to the stream of molten metal, so that the screen is wet when *and where* the metal strikes it. The water is vaporized as the hot metal strikes it, thus providing an insulating blanket of live steam between the molten metal and the screen.

In the alternative form of apparatus shown in Figure 2, the screen 23, corresponding to the screen 3 of the previous embodiment, is situated below the surface of the quenching medium in tank 10. Otherwise, the parts are identical with those previously described save that the water supply pipe 13 and its nozzle 14 are omitted.

In the manufacture of iron shot for use in shot gun shells, it is desirable to produce as high a yield as possible within the size range of 0.055 to 0.157 inch in diameter. The present invention produces advantageous yields of properly shaped shot within the size range just indicated. For example, utilizing the apparatus shown in Figure 2 with the screen one quarter of an inch under the surface of the quench bath, molten ingot iron poured at a temperature of 3100° F. through an atmosphere of air from an elevation of about 18 inches above the screen 23, yielded 70% (of the input metal) within the size range indicated above and of good sphericity. In this operation the screen was a cotton-covered wire screen having 10 mesh per lineal inch (mesh 0.077 inch square, filament diameter 0.018 inch) and moving at a lineal velocity (at the mean radius of impact) of 1.6 feet per second. The rate of pour was between 100 and 150 grams per second.

As another exemplary operation, utilizing the apparatus shown in Figure 1 with a 7-mesh cloth screen, rotating on an axis inclined 26° away from vertical, a yield of 80% within the size range aforesaid and of good sphericity was achieved. In this instance, the distance between the crucible lip and the screen (point of impact) was 8 inches and there was a distance of 30 inches between the screen and the surface of the quench bath. The iron was poured at the rate of 157 grams per second and at a temperature of 3100° F. The screen was moving at a velocity of 3.2 feet per second at the mean radius of impact.

When, other things remaining the same as in the last example, the screen-to-quench distance was reduced to 6 inches and the rate of pour reduced to 144 grams per second, the yield was 80%, but the average size of the resultant shot increased. Experience indicates that, as the distance between the screen and the surface of the quench bath is increased (other variables remaining the same), the average size of the resultant shot decreases, but sphericity improves. With the screen less than about 6 inches above the surface of the quench bath, the results are less satisfactory from the standpoint of both good shaping and uniformity of size. Similarly, increases in the ladle-to-screen distance result in some decreases of the average size of the shot, but this distance must be sufficiently short that the metal is fluid when it strikes the screen.

By reducing the inclination of the screen to 15°, providing a space of two feet between the screen and the quench bath, and maintaining other factors substantially the same as indicated in the paragraph next above, the yield was 81% with the average size of the shot reduced.

In addition to the yields indicated in the examples given above, there are appreciable quantities of shot of good sphericity, but whose size is outside the range of 0.055 to 0.157 inch. Such shot are suitable for other purposes than use in shot shells.

For shot shell purposes, but not for some other purposes, it is preferable to employ iron as pure as commercially feasible and relatively free of carbon. To facilitate the shot formation from such iron, it is preferable to elevate the temperature thereof to above 2800° F. before pouring from the ladle. The rate of pour is so controlled as to keep the concentration of globules (below the screen) low enough that the likelihood of collision between them (with resultant formation of "dumb-bells) is minimized.

In general, the greater the ratio of open area to obstructed area (filament) of the active portion of the screen, the higher the yield of shot of good sphericity.

The depth of the liquid in tank 10 is thirty inches or more or, in any case, sufficient to solidify the globules of metal before their fall is obstructed by the bottom or by other shot on the bottom.

In the embodiment of Figure 1, where the screen is situated above the surface of the quenching bath, the cooling liquid must be fed at a rate sufficient to keep the bibulous screen soaked or saturated. Where a bibulous screen is used, the velocity of movement is not of great importance—indeed the screen is moved only to assure that the increment of screen, exposed to the molten iron at any instant, is cool and wet.

While the invention has been described with particular reference to the manufacture of iron shot for use as ammunition projectiles, it is to be understood that the apparatus may be used with other metals, and to make shot for other purposes. Each different metal requires some adjustment of the several variables and likewise the optimum sizing of the shot.

From the foregoing description those skilled in the art should readily understand the invention and recognize that it accomplishes its objects. While several examples have been given for the purpose of illustration, it is to be distinctly understood that the invention is not limited to the details thereof.

Having thus described the invention, what is claimed and desired to be secured by Letters Patent is:

1. Apparatus of the kind described comprising, in combination, supply means for maintaining a supply of molten [metal] *iron* and for discharging a stream thereof, a screen arranged below said supply means and in the path of a stream of molten [metal] *iron* falling from said supply means, said screen having substantially more than half its active area occupied by open spaces, means for moving said screen transversely of the path of the stream of molten [metal] *iron* falling from said supply means, *means for maintaining the screen wet at the region thereof in the path of said stream of molten iron,* and a quench tank arranged to receive particles falling from said screen.

2. Apparatus of the kind described comprising, in combination, supply means for maintaining a supply of molten metal and for discharging a stream thereof, a screen arranged below said supply means and in the path of a stream of molten metal falling from said supply means, means for moving said screen transversely of the path of the stream of molten metal falling from said supply means, a quench tank arranged to receive particles falling from said screen, said screen having at least sixty-five per cent of its area open, and said screen having at least the outer increments of its constituent strands composed of bibulous material, and means for wetting said bibulous material with liquid coolant.

3. Apparatus of the kind described comprising, in combination, supply means for maintaining a supply of molten [metal] *iron* and for discharging a stream thereof, a screen arranged below said supply means and in the path of a stream of molten [metal] *iron* falling from said supply means, means for rotating said screen in a direction transversely of the path of a stream of molten [metal] *iron* falling from said supply means, *means for maintaining the screen wet at the region thereof in the path of said stream of molten iron,* and a quench tank arranged to receive particles falling from said screen, said screen having at least sixty-five per cent of its area open.

4. Apparatus of the kind described comprising a screen composed of strands, said strands having at least their outer increments composed of bibulous material, means for supplying a stream of molten metal to the upper surface of said screen, means for moving said screen transversely of the path of a stream falling from said supply means, and means for continually wetting the bibulous material with liquid coolant.

5. *The process of making iron shot which comprises, melting substantially pure iron, pouring a stream of the molten iron onto and through a moving wet screen having substantially more than half of its active area occupied by open spaces, thereby subdividing the stream into particles of molten iron, and, before the particles become completely solidified, enveloping them in a liquid quench bath of depth sufficient to completely solidify said particles during free falling thereof in said bath.*

ROBERT R. HANCOX.
GEORGE L. TUER, JR.
MILO J. STUTZMAN.

REFERENCES CITED

The following references are of record in the file of this patent or the original patent:

UNITED STATES PATENTS

| Number | Name | Date |
|---|---|---|
| 1,959,014 | Woodward | May 15, 1934 |
| 2,305,172 | Landgraf | Dec. 15, 1942 |
| 2,356,599 | Landgraf | Aug. 22, 1944 |

FOREIGN PATENTS

| Number | Country | Date |
|---|---|---|
| 294,921 | Germany | Nov. 1, 1916 |